United States Patent
Wang (10) Patent No.: US 12,517,836 B2
(45) Date of Patent: Jan. 6, 2026

(54) COMPUTING SYSTEM AND METHOD FOR POWER-SAVING COMPUTE-IN-MEMORY DESIGN

(71) Applicant: MEDIATEK INC., Hsinchu (TW)

(72) Inventor: Tso Wang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 18/917,369

(22) Filed: Oct. 16, 2024

(65) Prior Publication Data

US 2025/0130950 A1 Apr. 24, 2025

Related U.S. Application Data

(60) Provisional application No. 63/591,468, filed on Oct. 19, 2023.

(51) Int. Cl.
*G06F 12/0897* (2016.01)

(52) U.S. Cl.
CPC ...... *G06F 12/0897* (2013.01); *G06F 2212/27* (2013.01); *G06F 2212/454* (2013.01)

(58) Field of Classification Search
None
See application file for complete search history.

(56) References Cited

U.S. PATENT DOCUMENTS

| | | | |
|---|---|---|---|
| 10,831,678 B2 * | 11/2020 | Wang | G06F 12/126 |
| 2012/0151232 A1 * | 6/2012 | Fish, III | G06F 12/0842 |
| | | | 711/125 |
| 2022/0197647 A1 * | 6/2022 | Kayiran | G06F 13/1668 |

* cited by examiner

*Primary Examiner* — Baboucarr Faal
(74) *Attorney, Agent, or Firm* — McClure, Qualey & Rodack, LLP (57) ABSTRACT

A computing system with power-saving compute-in-memory (CIM) design that minimizes the computation energy of the matrix-matrix multiplication is shown. A processor control unit loads A blocks divided from a matrix $A_{M \times K}$ from a second-level (L2) memory to a first-level (L1) memory, and loads B blocks divided from a matrix $B_{K \times N}$ from the L2 memory to a CIM memory. The A blocks buffered in the L1 memory are programmed to a register file to be entered into the CIM memory. The CIM memory performs multiply-and-accumulate (MAC) calculations on the A blocks and the B blocks to generate C blocks which form a matrix $C_{M \times N}$ ($=A_{M \times K} \times B_{K \times N}$). Based on the size of $A_{M \times K}$ and $B_{K \times N}$, an A block buffering capability of the L1 memory, and a B block buffering capability of the CIM memory, the reuse scheme is properly selected to reuse the buffered A blocks and B blocks.

20 Claims, 4 Drawing Sheets

FIG. 1 (PRIOR ART)

M>N => first_reuse_A

FIG. 2A ( PRIOR ART )

M<N => first_reuse_B

COMPUTING SYSTEM AND METHOD FOR POWER-SAVING COMPUTE-IN-MEMORY DESIGN

CROSS REFERENCE TO RELATED APPLICATIONS

This application claims the benefit of U.S. Provisional Application No. 63/591,468, filed Oct. 19, 2023, the entirety of which is incorporated by reference herein.

BACKGROUND OF THE INVENTION

Field of the Invention

The present invention relates to Compute-in-memory (CIM) processors.

Description of the Related Art

The computations of the matrix-matrix multiplication (i.e. $C_{M \times N} = A_{M \times K} \times B_{K \times N}$) are usually encountered in scientific and engineering fields. For instance, many of the calculations performed in neural network applications are matrix-matrix multiplications. In an example of matrix-matrix multiplication for neural network applications, one calculation: $C_{M \times N} = A_{M \times K} \times B_{K \times N}$, computes a weighted activation matrix $C_{M \times N}$ (including M×N weighted activations) from the multiplication of an activation matrix $A_{M \times K}$ (formed by M×K activations) and a weight matrix $B_{K \times N}$ (formed by K×N weights). Compute-in-Memory (CIM) technology proposes a new type of memory that stores the entries of $B_{K \times N}$, and performs an "INNER PRODUCT" operation between the entries of $B_{K \times N}$ stored in the CIM memory and the entries of $A_{M \times K}$ as the input into the CIM memory. The CIM memory may further accumulate the inner products of the entries of $B_{K \times N}$ and the entries of $A_{M \times K}$, to complete a multiply-and-accumulate (MAC) calculation required in matrix-matrix multiplication. The matrix-matrix multiplication is accelerated through such a CIM memory.

However, the matrices in applications of scientific and engineering fields (e.g. for some of those used in artificial intelligence (AI) model inference) may be large in size. H. T. Kung, V. Natesh and A. Sabot propose in their paper "CAKE: Matrix-matrix Multiplication Using Constant-Bandwidth Blocks" in SC21 (International Conference for High Performance Computing, Networking, Storage and Analysis, St. Louis, MO, USA, 2021, pp. 1-13, doi: 10.1145/3458817.3476166) to handle the large-sized matrix-matrix multiplications. According to the novel matrix-matrix multiplication algorithm CAKE, the matrix $A_{M \times K}$ is divided into A blocks, and the matrix $B_{K \times N}$ is divided into B blocks. The huge calculation of $A_{M \times K} \times B_{K \times N}$ is divided into the small-sized matrix-matrix multiplication.

Figure 1:
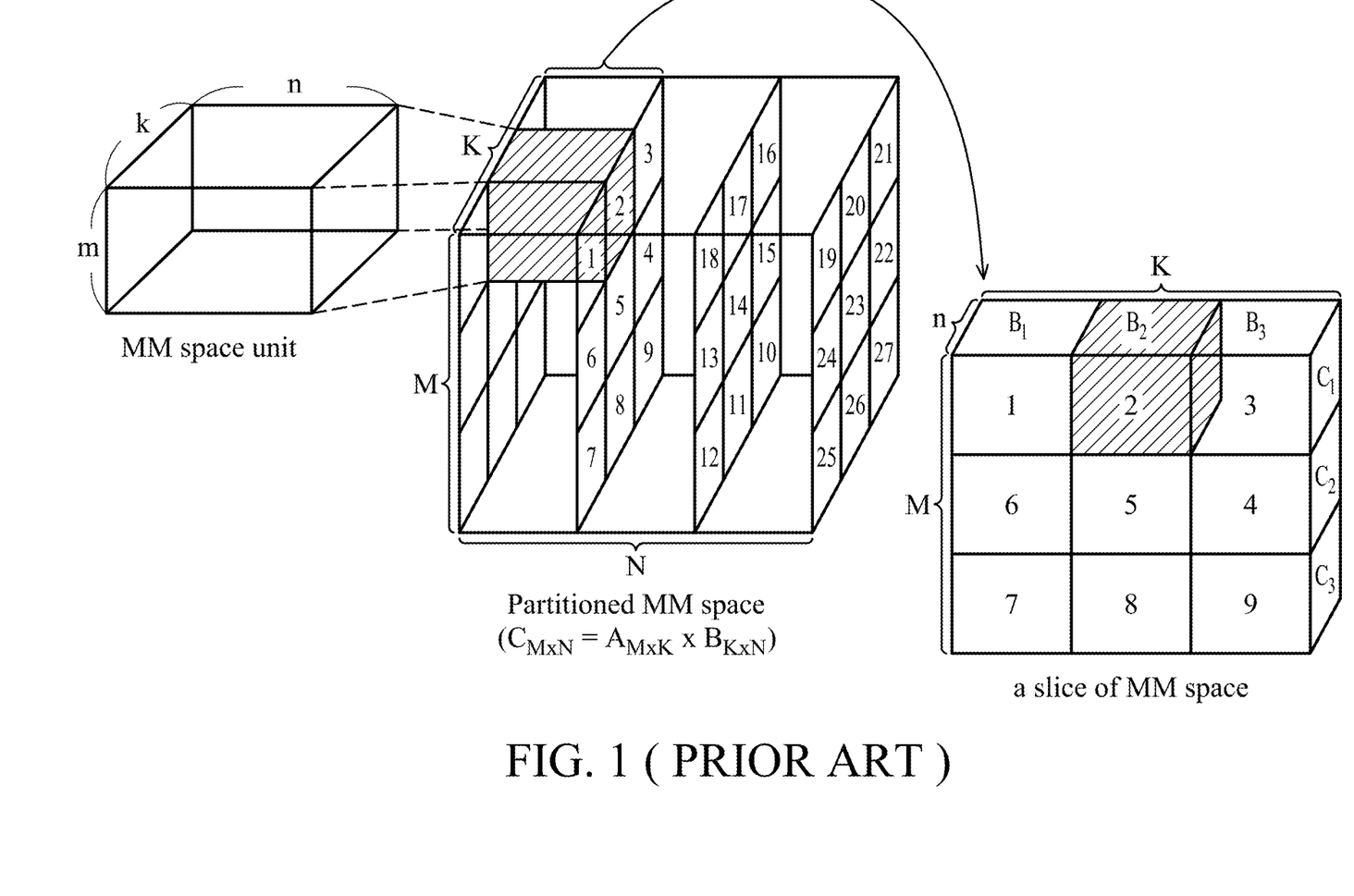
FIG. 1 depicts the concept of the CAKE algorithm.

FIG. 1 depicts the concept of the CAKE algorithm. In the middle picture, the matrix $A_{M \times K}$ is represented on the left side of the cube, the matrix $B_{K \times N}$ is represented on the upper side of the cube, and the matrix $C_{M \times N}$ is represented on the back side of the cube. The cube shows a matrix-matrix multiplication (MM) space representing the matrix-matrix multiplication $C_{M \times N} = A_{M \times K} \times B_{K \times N}$, and is partitioned into MM space units (e.g., the 3-D blocks numbered from 1 to 27).

Referring to the left picture, each MM space unit has dimensions m×k×n. Referring to the slice of MM space presented in the right picture, it includes MM space units 1 to 9 in the middle picture. As shown, MM space unit 1 relates to a block A1 (on the back side of the right picture but obscured) and a block B1 (on the upper side of the picture), block 2 relates to a block A2 (on the back side of the right picture but obscured) and a block B2 (on the upper side of the picture), block 3 relates to a block A3 (on the back side of the right picture but obscured) and a block B3 (on the upper side of the picture), block 4 relates to a block A4 (on the back side of the right picture but obscured) and the block B3, block 5 relates to a block A5 (on the back side of the right picture but obscured) and the block B2, block 6 relates to a block A6 (on the back side of the right picture but obscured) and the block B1, block 7 relates to a block A7 (on the back side of the right picture but obscured) and the block B1, block 8 relates to a block A8 (on the back side of the right picture but obscured) and the block B2, and block 9 relates to a block A9 (on the back side of the right picture but obscured) and the block B3. Three C blocks (three 2-D blocks) C1, C2, and C3 are presented on the right side of the slice of MM space. The block C1 is calculated from A1×B1+A2×B2+A3×B3. The block C2 is calculated from A4×B3+A5×B2+A6×B1, wherein the block B3 used in the final step of the C1 calculation can be reused in the first step of the C2 calculation. The block C3 is calculated from A7×B1+A8×B2+A9×B3, wherein the block B1 used in the final step of the C2 calculation can be reused in the first step of the C3 calculation. The block reuse concept is called inter-block reuse, which reduces the number of memory (e.g. DRAM) accesses.

Figure 2A:
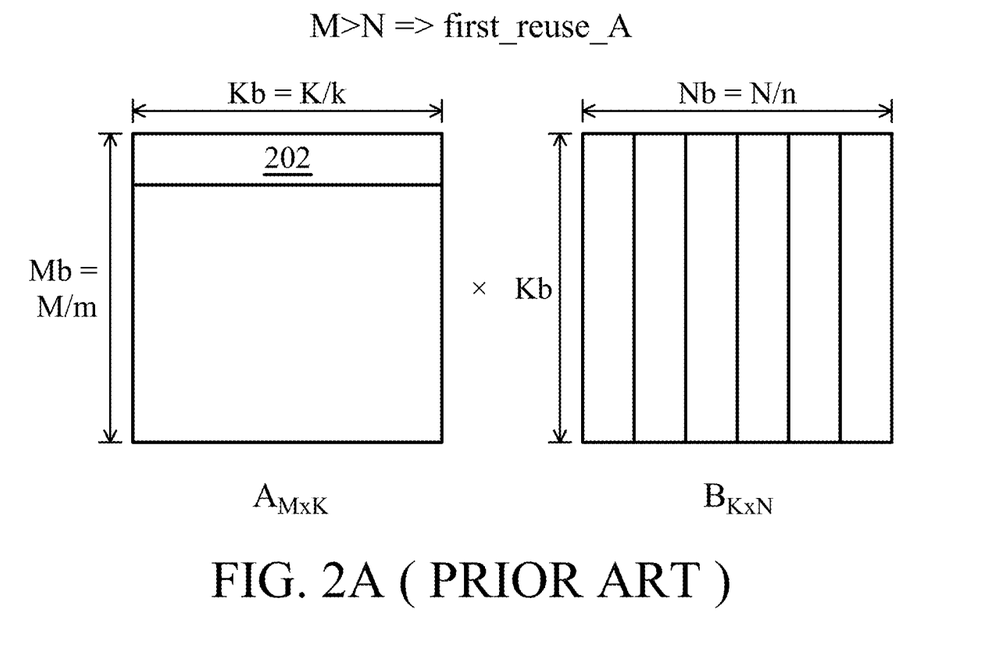
FIG. 2A depicts the concept of a first reuse scheme first_reuse_A.
Figure 2B:
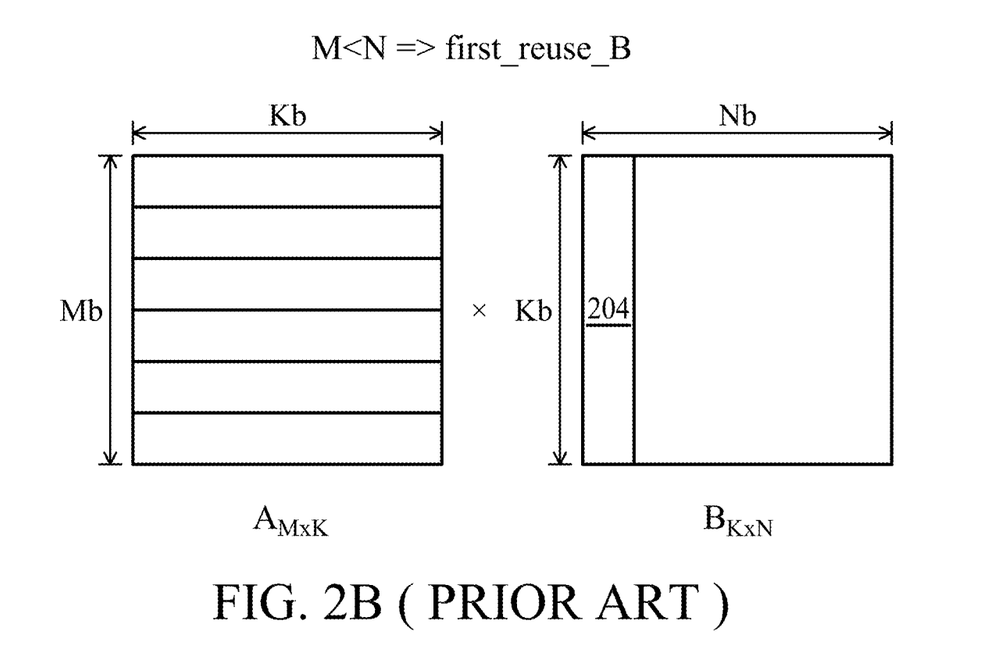
FIG. 2B depicts the concept of a second reuse scheme first_reuse_B.

The reuse concept may be implemented in some ways. In conventional designs, the reuse scheme depends on the matrix size. FIG. 2A depicts the concept of a first reuse scheme first_reuse_A. According to the first reuse scheme first_reuse_A, the buffered A blocks are reused even if the B block buffer has been updated. FIG. 2B depicts the concept of a second reuse scheme first_reuse_B. According to the second reuse scheme first_reuse_B, the buffered B blocks are reused even if the A block buffer has been updated.

When the size of matrix $A_{M \times K}$ is larger than the size of matrix $B_{K \times N}$ (i.e., M>N), the first reuse scheme first_reuse_A (referring to FIG. 2A) works, by which every Kb (=K/k) A blocks (e.g. the row of A blocks indicated by 202) are reused till the row of A blocks are processed by the all Nb (=N/n) columns of B blocks (obtained from the matrix $B_{K \times N}$) for matrix-matrix multiplication. When the size of matrix $A_{M \times K}$ is smaller than the size of matrix $B_{K \times N}$ (i.e., M<N), the second reuse scheme first_reuse_B (referring to FIG. 2B) works, by which every Kb B blocks (e.g. the column of B blocks indicated by 204) are reused till the column of B blocks are processed by the all Mb (=M/m) rows of A blocks (obtained from the matrix $A_{M \times K}$) for matrix-matrix multiplication.

However, in some computing architectures, the conventional matrix-size-related reuse scheme may still result in considerable power consumption. There is a need in the art for an energy-efficient matrix-matrix multiplication technology.

BRIEF SUMMARY OF THE INVENTION

The present invention aims to minimize the memory access energy to save power for matrix-matrix multiplication in a computing system.

A computing system in accordance with an exemplary embodiment of the invention includes a computing-in-memory (CIM) design. The computing system includes a CIM processor and a two-level memory system coupled to the CIM processor. The CIM processor includes a processor control unit, a CIM memory with CIM capability, and a register file. The two-level memory system includes a first-level (L1) memory and a second-level (L2) memory. The processor control unit is operable to load A blocks (divided from a matrix $A_{M \times K}$) from the L2 memory to the L1 memory, and load B blocks (divided from a matrix $B_{K \times N}$) from the L2 memory to the CIM memory. The processor control unit further is operable to program the A blocks buffered in the L1 memory to the register file to be entered into the CIM memory. The CIM memory performs multiply-and-accumulate (MAC) calculations on the A blocks and the B blocks to generate C blocks. The C blocks will form a matrix $C_{M \times N}$ ($=A_{M \times K} \times B_{K \times N}$). Based on the size of the matrix $A_{M \times K}$, the size of the matrix $B_{K \times N}$, the A block buffering capability ($\mu$) of the L1 memory, and the B block buffering capability (L) of the CIM memory, the CIM processor selects a reuse scheme to reuse the A blocks buffered in the L1 memory and the B blocks buffered in the CIM memory.

In an exemplary embodiment, the number of A blocks divided from the matrix $A_{M \times K}$ is $M_b \times K_b$, where $M_b = M/m$, and $K_b = K/k$. The number of B blocks divided from the matrix $B_{K \times N}$ is $K_b \times N_b$, where $N_b = N/n$. $M_b$, $K_b$, and No representing the size of the matrix $A_{M \times K}$ and the matrix $B_{K \times N}$ are used in selecting the reuse scheme.

In an exemplary embodiment, $m = n = m_c$, and $k = \alpha m_c$, where $\alpha$ is greater than 0. In response to a situation wherein $M_b > 1$ and $N_b > 1$, the CIM processor judges $K_b$ to select the reuse scheme based on a threshold function T(•), wherein the threshold function T(•) is the function of the A block buffering capability ($\mu$) of the L1 memory and the sparsity of the matrix $B_{K \times N}$ ($s_s$). In some exemplary embodiments, the threshold function T(•) further depends on $M_b$ and $N_b$. In an exemplary embodiment, the threshold function T(•) is:

$$T(\cdot) = \frac{\mu}{(1-s_s)} \text{ or } T(\cdot) = T(M_b, N_b) = \frac{\mu}{(1-s_s)} \cdot \frac{M_b(N_b - 1)}{N_b(M_b - 1)}$$

where $1 \leq \mu \leq K_b$, and $0 \leq s_s < 1$. $L_{max}$ denotes the upper limit to which the CIM memory buffers the B blocks. When min $(L_{max}, K_b) < T(\cdot)$, the CIM processor sets the B block buffering capability, L, of the CIM memory to min(2, $K_b$), and selects a first reuse scheme first_reuse_A. According to the first reuse scheme first_reuse_A, the A blocks buffered in the L1 memory are reused even if the CIM memory has updated the B blocks buffered therein. When min($L_{max}, K_b$) $\geq$ T(•), the CIM processor sets the B block buffering capability, L, of the CIM memory to min($L_{max}, K_b$), and selects a second reuse scheme first_reuse_B. According to the second reuse scheme first_reuse_B, the B blocks buffered in the CIM memory are reused even if the L1 memory has updated the A blocks buffered therein.

A more proper reuse scheme is selected according to the proposed technology. The foregoing concept can also realize a method for power saving of a compute-in-memory (CIM) design.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 3:
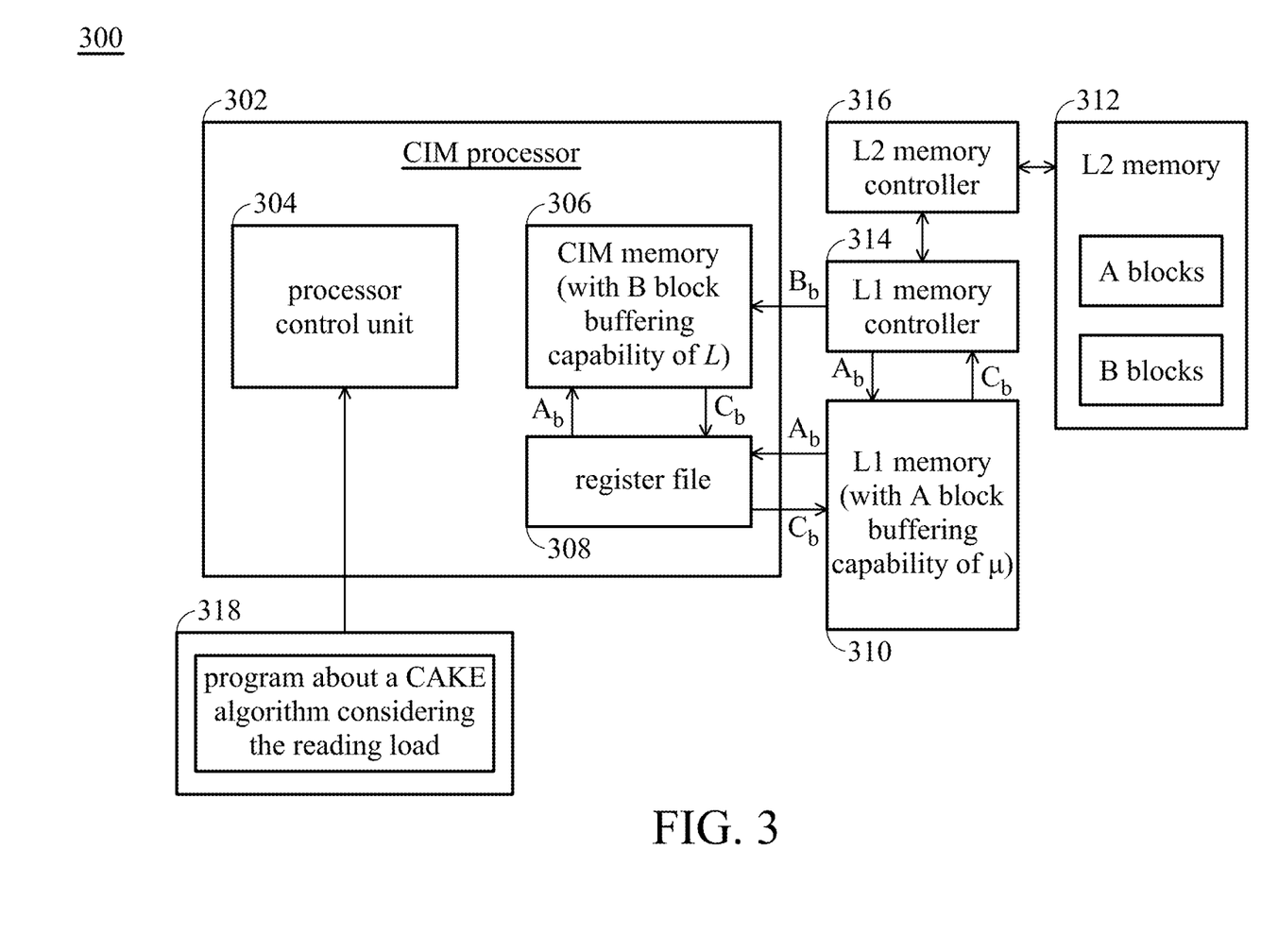
FIG. 3 depicts a computing system 300 in accordance with an exemplary embodiment of the present invention.

FIG. 3 depicts a computing system 300 in accordance with an exemplary embodiment of the present invention. The computing system 300 may be any computer device, or an edge device (e.g., a smart phone, or any computing devices near the network's edge). The computing system 300 includes a Compute-in-memory (CIM) processor 302 that has a processor control unit 304, a Compute-in-memory (CIM) memory 306, and a register file 308 coupled to the CIM memory 306. The computing system 300 further includes a two-level memory system (e.g., a cache system) that includes a first-level memory (a.k.a. L1 memory) 310, a second-level memory (a.k.a. L2 memory) 312, an L1 memory controller 314, and an L2 memory controller 316. The L2 memory controller 316 controls the L2 memory 312 and communicates with the L1 memory controller 314. The L1 memory controller 314 controls the L1 memory 310 and further communicates with the CIM processor 302. The computing system 300 further includes a computer readable medium 318 that stores a program about a novel CAKE algorithm introduced in the disclosure. The program instructions are read and cached in an instruction cache (not shown in the figure), to be executed by the processor control unit 304 to load data into the CIM memory 306 to complete a matrix-matrix multiplication.

The matrix-matrix multiplication is $C_{M \times N} = A_{M \times K} \times B_{K \times N}$. The matrix-matrix multiplication (MM) space (referring to the middle cube presented in FIG. 1) representing the matrix-matrix multiplication $C_{M \times N} = A_{M \times K} \times B_{K \times N}$ is partitioned into MM space units. Each MM space unit has dimensions m×k×n (referring to the left picture of FIG. 1). The matrix $A_{M \times K}$ is divided into $M_b \times K_b$ blocks (2D blocks, named A blocks), where $M_b$ is M/m, and $K_b$ is K/k. The matrix $B_{K \times N}$ is divided into $K_b \times N_b$ blocks (2D blocks, named B blocks), where $N_b$ is N/n. The matrix $C_{M \times N}$ is formed by $M_b \times N_b$ blocks (2D blocks, named C blocks). Each C block ($C_b$) is obtained from the multiply-and-accumulate (MAC) calculation of its corresponding A blocks ($A_b$) and B blocks ($B_b$).

The A blocks and B blocks are stored in the L2 memory 312. The matrix $B_{K \times N}$ may have the sparsity $s_s$ ($0 \leq s_s < 1$) and can be compressed in case its entries are static (e.g. weights of the neural network layer for inference are static) so that B blocks may be stored in the compressed format in L2 memory 312. The sparsity $s_s$ of the matrix $B_{K \times N}$ will be set zero to indicate compression does not apply to the B blocks even though the matrix $B_{K \times N}$ has zero valued entries. The L2 memory controller 316 reads the A blocks and B blocks (perhaps compressed) from the L2 memory 312, decompress B blocks if necessary (i.e. the matrix $B_{K \times N}$ has zero valued entries and compression applies to B blocks so that $s_s$ will be greater than 0), and passes A blocks and decompressed B blocks (decompression will not be performed on B blocks if $s_s=0$) to the L1 memory controller 314. The L1 memory controller 314 loads the A blocks ($A_b$) to the L1 memory 310, and loads the B blocks ($B_b$) to the CIM memory 306. The A block buffering capability of the L1 memory 310 is $\mu$, where $1 \leq \mu \leq K_b$. It means that the number of A blocks buffed in the L1 memory 310 can be up to $\mu$. The B block buffering capability of the CIM memory 306 is L, where $1 \leq L \leq K_b$. It means that the number of B blocks buffed in the CIM memory 306 can be up to L. For MAC calculation that generates one C block $C_b$, the A blocks read from the L1 memory 310 are programmed into the register file 308 to be entered into the CIM memory 306. In the CIM memory 306, the received A blocks are multiplied by the buffered B blocks (small-sized matrix-matrix multiplication) and the products are accumulated to form one C block $C_b$ (where $C_b += A_b \times B_b$, referring to the right picture in FIG. 1). Through the register file 308, the C block $C_b$ generated by the CIM memory 306 is temporarily stored in the L1 memory 310. In the background mode of the computing system 300, the C blocks are stored back to the L2 memory 312 through the L1 memory controller 314 and the L2 memory controller 316.

In such a computing architecture, the power consumption is due to: reading of the two-level memory (referring to the L1 and L2 memories 310 and 312); multiply-and-accumulate (MAC) computing of the CIM memory 306; and accessing of the register file 308. In the disclosure, the focus is on fully utilizing the A block buffer of the L1 memory 310 and the B block buffer of the CIM memory 306, to suppress the power consumption of reading the L1 memory 310 and the L2 memory 312.

The first reuse scheme first_reuse_A (referring to FIG. 2A) is implemented by the A block buffer provided by the L1 memory 310. The second reuse scheme first_reuse_B (referring to FIG. 2B) is implemented by the B block buffer provided by the CIM memory 306. According to the first reuse scheme first_reuse_A, the A blocks buffered in the L1 memory 310 are reused even if the CIM memory 306 has updated the B blocks buffered therein. According to the second reuse scheme first_reuse_B, the B blocks buffered in the CIM memory 306 are reused even if the L1 memory 310 has updated the A blocks buffered therein. By executing the program stored in the computer readable medium 318, an improved CAKE algorithm is applied to select a proper reuse scheme from the first reuse scheme first_reuse_A and the second reuse scheme first_reuse_B, and the power consumption due to reading the two-level memory is considerably suppressed.

Different from the conventional technology that selects the reuse scheme based on only the size of the matrix $A_{M \times K}$ and the matrix $B_{K \times N}$, the size of the A block buffer provided by the L1 memory 310 ($\mu$) and the size of the B block buffer provided by the CIM memory 306 (L) are also considered in the proposed technology about reuse scheme selection.

In an exemplary embodiment, the size of an MM space unit (m×n×k) has the following characteristics: $m=n=m_c$, and $k=\alpha m_c$ ($\alpha>0$). A variable $\sigma$ denotes the energy consumption of reading the L2 memory 312 with a constant scaling $\delta_1$. A variable $\beta$ denotes the energy consumption of reading the L2 memory 312 and the L1 memory 310 (with a constant scaling $\delta_1$ and $\delta_2$, respectively). The sparsity of the matrix $B_{K \times N}$ is $s_s$ ($0 \leq s_s < 1$). When the first reuse scheme first_reuse_A is adopted, the energy consumption of reading the L1 and L2 memories 310 and 312 may be represented as: $(\beta+\sigma-s_s\sigma)M_b K_b N_b + \mu\sigma M_b(1-N_b)+(1-s_s)L\sigma(1-M_b)$. When the second reuse scheme first_reuse_B is adopted, the energy consumption of reading the L1 and L2 memories 310 and 312 may be represented as: $(\beta+\sigma-s_s\sigma)M_b K_b N_b+(1-s_s)L\sigma N_b(1-M_b)+\mu\sigma(1-N_b)$. By substituting $\beta=c\sigma$ (c>1) and neglecting $\sigma$ in the energy consumption comparison, the energy consumption index values of the two different reuse schemes are:

$$f_A(M_b, K_b, N_b) = (c+1-s_s)M_b K_b N_b + \mu M_b(1-N_b) + (1-s_s)L(1-M_b)$$

$$f_B(M_b, K_b, N_b) = (c+1-s_s)M_b K_b N_b + (1-s_s)LN_b(1-M_b) + \mu(1-N_b)$$

If any of $M_b$ and $N_b$ is 1, $f_A(M_b, K_b, N_b)=f_B(M_b, K_b, N_b)$, regardless of what the value L (the B block buffering capability provided by the CIM memory 306) is. If $M_b>1$ and $N_b>1$, the comparison between $f_A(M_b, K_b, N_b)$ and $f_B(M_b, K_b, N_b)$ depends on the magnitudes of $M_b$, $N_b$, $\mu$ and L.

In an exemplary embodiment, a threshold function T(•) is proposed:

$$T(\cdot) = \frac{\mu}{(1-s_s)}$$

The threshold function T(•) as the function of u (the A block buffering capability of the L1 memory 310) and $s_s$ ($0 \leq s_s < 1$, the sparsity of the matrix $B_{K \times N}$) is applied to judge the value of $K_b$ when $M_b>1$ and $N_b>1$. In another exemplary embodiment, the threshold function is:

$$T(\cdot) = T(M_b, N_b) = \frac{\mu}{(1-s_s)} \cdot \frac{M_b(N_b-1)}{N_b(M_b-1)}$$

which further depends on $M_b$ and $N_b$.

When $K_b \geq T(\cdot)$, the B block buffering capability L provided by the CIM memory 306 is set to $K_b$, and the second reuse scheme first_reuse_B is selected to reuse the B blocks buffered in the CIM memory 306 even if the L1 memory 310 has updated the A blocks buffered therein. According to the second reuse scheme first_reuse_B, every $K_b$ B blocks (e.g. a column of B blocks buffered in the CIM memory 306) are reused till the column of B blocks are processed by the all $M_b$ rows of A blocks for matrix-matrix multiplication.

When $K_b<T(\cdot)$, the B block buffering capability L provided by the CIM memory 306 is set to 2, and the first reuse scheme first_reuse_A is selected to reuse the A blocks buffered in the L1 memory 310 even if the CIM memory 306 has updated the B blocks buffered therein. According to the first reuse scheme first_reuse_A, every u A blocks buffered in the L1 memory 310 are reused till being processed by the all related B blocks for matrix-matrix multiplication.

In the simpler situations, the threshold function T(•) is not required. When $M_b>N_b=1$, the B block buffering capability L provided by the CIM memory 306 is set to a non-zero integer greater than or equal to 2, and the second reuse scheme first_reuse_B may be selected to reuse the B blocks buffered in the CIM memory 306 though the first reuse scheme first_reuse_A results in the same energy consumption index values as the second reuse scheme first_reuse_B because in some exemplary embodiments, the second reuse scheme first_reuse_B is only selected in this situation.

When $N_b>M_b=1$, the B block buffering capability L provided by the CIM memory 306 is set to a non-zero integer greater than or equal to 2, and the first reuse scheme first_reuse_A may be selected to reuse the A blocks buffered in the L1 memory 310 though the second reuse scheme first_reuse_B results in the same energy consumption index values as the first reuse scheme first_reuse_A because in some exemplary embodiments, the first reuse scheme first_reuse_A is only selected in this situation.

When $M_b=N_b=1$, the B block buffering capability L provided by the CIM memory 306 is set to a non-zero integer greater than or equal to 2. The first reuse scheme first_reuse_A and the second reuse scheme first_reuse_B result in the same power consumption. The reuse scheme can be kept at the previous setting.

Table 1 shows the aforementioned reuse strategy.

TABLE 1

| Values of $M_b, N_b$ | Condition | Energy comparison | L setting | reuse scheme |
|---|---|---|---|---|
| $M_b = N_b = 1$ | Not applied | $f_A(M_b, K_b, N_b) = f_B(M_b, K_b, N_b)$ | non-zero integer $\geq 2$ | first_reuse_A or first_reuse_B |
| $M_b > N_b = 1$ | Not applied | $f_A(M_b, K_b, N_b) = f_B(M_b, K_b, N_b)$ | non-zero integer $\geq 2$ | first_reuse_B |
| $N_b > M_b = 1$ | Not applied | $f_A(M_b, K_b, N_b) = f_B(M_b, K_b, N_b)$ | non-zero integer $\geq 2$ | first_reuse_A |
| $N_b > 1, M_b > 1$ | $K_b \geq T(\cdot)$ | $f_A(M_b, K_b, N_b) \geq f_B(M_b, K_b, N_b)$ | choose $L = K_b$ | first_reuse_B |
| | $K_b < T(\cdot)$ | $f_A(M_b, K_b, N_b) < f_B(M_b, K_b, N_b)$ | choose $L = 2$ | first_reuse_A |

If the reuse scheme is selected only based on the matrix size as that taught in the conventional technology without considering the A block buffering capability μ of the L1 memory 310 and the B block buffering capability of L the CIM memory 306, the selected reuse scheme may not be the best reuse scheme. In some exemplary embodiments, the hardware limitation, $L_{max}$, of the B block buffer provided by the CIM memory 306 is taken into consideration. The upper limit of B blocks buffered in the CIM memory 306 is $L_{max}$.

When $\min(L_{max}, K_b) \geq T(\cdot)$, the B block buffering capability L provided by the CIM memory 306 is set to $\min(L_{max}, K_b)$, and the second reuse scheme first_reuse_B is selected to reuse the B blocks buffered in the CIM memory 306. When $K_b < T(\cdot)$, the B block buffering capability L provided by the CIM memory 306 is set to $\min(2, K_b)$, and the first reuse scheme first_reuse_A is selected to reuse the A blocks buffered in the L1 memory 310.

Table 2 shows the reuse strategy considering the hardware limitation.

Figure 4:
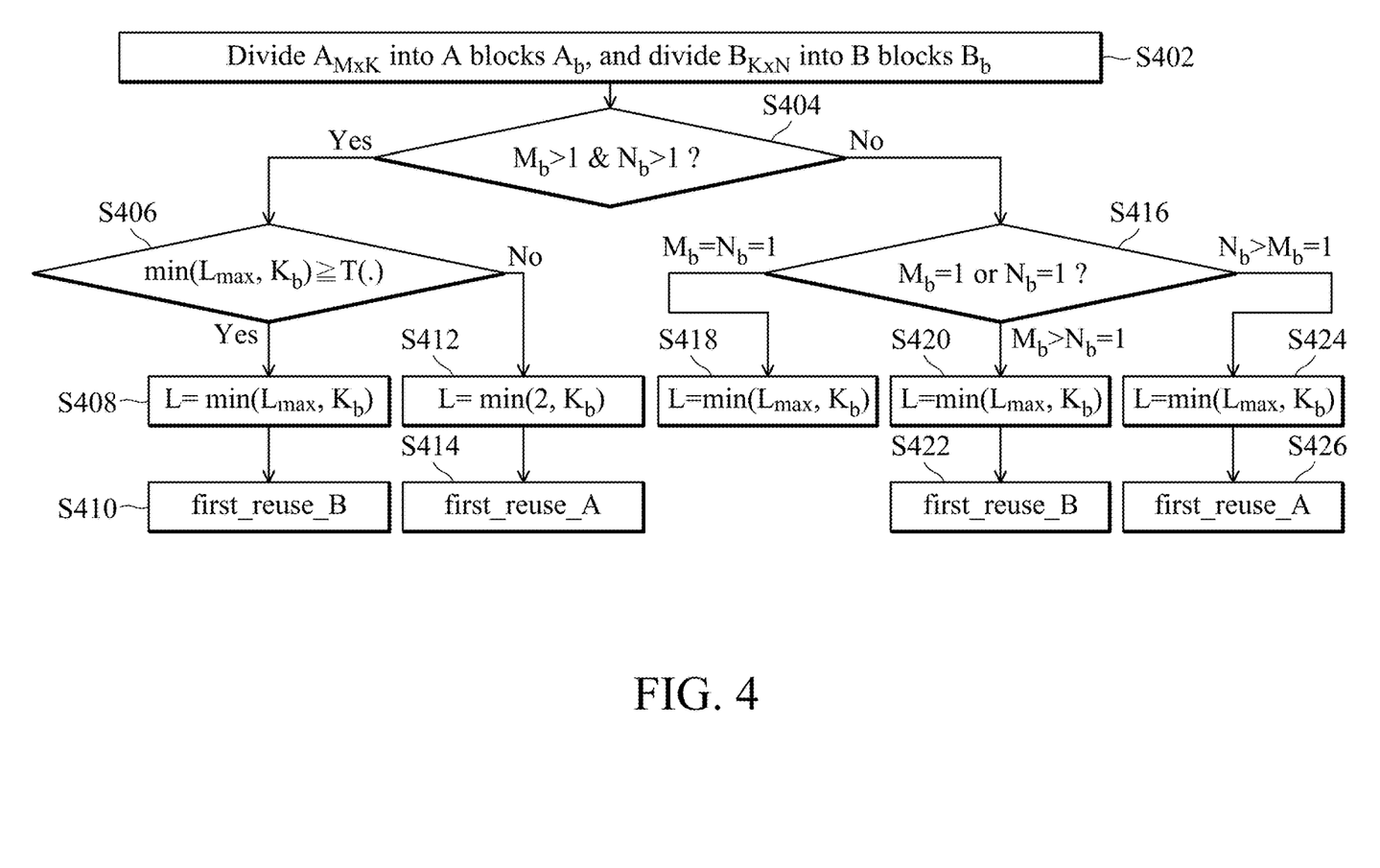
FIG. 4 is a flow diagram about a method for reuse scheme selection in accordance with an exemplary embodiment of the present invention.

FIG. 4 is a flow diagram about a method for reuse scheme selection in accordance with an exemplary embodiment of the present invention.

In step S402, the matrix $A_{M \times K}$ is divided into blocks $A_b$, and the matrix $B_{K \times N}$ is divided into blocks $B_b$. Each block $A_b$ is a small matrix of dimension m×k, which is also named an A block. The total number of the A blocks $A_b$ is $M_b \times K_b$, where $M_b$ is M/m, $K_b$ is K/k. Each block $B_b$ is a small matrix of dimension k×n, which is also named a B block. The total number of the B blocks $B_b$ is $K_b \times N_b$, where $N_b$ is N/n. Especially, $m=n=m_c$, and $k=\alpha m_c$ ($\alpha>0$). The A blocks $A_b$ and the B blocks $B_b$ are stored into the L2 memory 312.

In step S404, the values of $M_b$ and $N_b$ are checked. It is determined whether $M_b$ and $N_b$ both are greater than 1. If yes, step S406 is performed to compare $\min(L_{max}, K_b)$ with the threshold function $T(\cdot)$, where $L_{max}$ is the hardware limitation of the B block buffer of the CIM memory 306, and the threshold function $T(\cdot)$ is:

$$T(\cdot) = \frac{\mu}{(1-s_s)} \text{ or } T(\cdot) = T(M_b, N_b) = \frac{\mu}{(1-s_s)} \cdot \frac{M_b(N_b-1)}{N_b(M_b-1)}$$

where μ is the A block buffering capability provide by the L1 memory 310, and $s_s$ is the sparsity of the matrix $B_{K \times N}$ ($0 \leq s_s < 1$).

If $\min(L_{max}, K_b) \geq T(\cdot)$, step S408 is performed to set the B block buffering capability L to $\min(L_{max}, K_b)$. The number of B blocks buffered in the CIM memory 306 in the same time is up to L. In step S410, the second reuse scheme

TABLE 2

| Values of $M_b, N_b$ | Condition | Energy comparison | L setting | reuse scheme |
|---|---|---|---|---|
| $M_b = N_b = 1$ | Not applied | $f_A(M_b, K_b, N_b) = f_B(M_b, K_b, N_b)$ | $L = \min(L_{max}, K_b)$ | first_reuse_A or first_reuse_B |
| $M_b > N_b = 1$ | Not applied | $f_A(M_b, K_b, N_b) = f_B(M_b, K_b, N_b)$ | $L = \min(L_{max}, K_b)$ | first_reuse_B |
| $N_b > M_b = 1$ | Not applied | $f_A(M_b, K_b, N_b) = f_B(M_b, K_b, N_b)$ | $L = \min(L_{max}, K_b)$ | first_reuse_A |
| $N_b > 1, M_b > 1$ | $\min(L_{max}, K_b) \geq T(\cdot)$ | $f_A(M_b, K_b, N_b) \geq f_B(M_b, K_b, N_b)$ | $L = \min(L_{max}, K_b)$ | first_reuse_B |
| | $K_b < T(\cdot)$ | $f_A(M_b, K_b, N_b) < f_B(M_b, K_b, N_b)$ | $L = \min(2, K_b)$ | first_reuse_A |

In table 2, when any of $M_b$ and $N_b$ is 1, the B block buffering capability L provided by the CIM memory 306 is set to $\min(L_{max}, K_b)$. For example, the B block buffering capability L provided by the CIM memory 306 may be set to a non-zero integer greater than or equal to 2.

first_reuse_B is selected. The B blocks buffered in the CIM memory 306 are reused till the CIM memory 306 completes the multiply-and-accumulate calculation between the buffered B blocks and all of its related A blocks. The L1 memory 310 is continuously updated by the required A blocks while the B blocks buffered in the CIM memory 306 are reused to complete the calculation of the target C block.

If step S406 determines that min($L_{max}$, $K_b$)<T(•), step S412 is performed to set the B block buffering capability L to min(2, $K_b$). In step S414, the first reuse scheme first_reuse_A is selected. The A blocks buffered in the L1 memory 310 are reused by the CIM memory 306 till the multiply-and-accumulate calculations between the reused A blocks and all of its related B blocks are finished. The CIM memory 306 is continuously updated by the required B blocks while the A blocks buffered in the L1 memory 310 are reused to complete the calculation of the target C block.

If any of $M_b$ and $N_b$ is not greater than 1, step S416 is performed to further check whether any of $M_b$ and $N_b$ is 1. If $M_b=N_b=1$, step S418 is performed, by which the B block buffering capability L provide by the CIM memory 306 is set to min($L_{max}$, $K_b$) (i.e. a non-zero integer greater or equal to 2). There is no need to change the reuse scheme. The reuse scheme may be the first reuse scheme first_reuse_A or the second reuse scheme first_reuse_B.

If $M_b>N_b=1$, step S420 is performed, by which the B block buffering capability L provide by the CIM memory 306 is set to min($L_{max}$, $K_b$) (i.e. a non-zero integer greater or equal to 2). In step S422, the second reuse scheme first_reuse_B is selected. The B blocks buffered in the CIM memory 306 are reused till the CIM memory 306 completes the multiply-and-accumulate calculation between the buffered B blocks and all of its related A blocks.

If $N_b>M_b=1$, step S424 is performed, by which the B block buffering capability L provide by the CIM memory 306 is set to min($L_{max}$, $K_b$) (i.e. a non-zero integer greater or equal to 2). In step S426, the first reuse scheme first_reuse_A is selected. The A blocks buffered in the L1 memory 310 are reused by the CIM memory 306 till the multiply-and-accumulate calculations between the reused A blocks and all of its related B blocks are finished.

Based on the aforementioned concept, a method for power saving of a compute-in-memory (CIM) design is proposed in accordance with an exemplary embodiment of the present invention. The method includes loading A blocks divided from a matrix $A_{M\times K}$ from the L2 memory 312 to the L1 memory 310. The method includes loading B blocks divided from a matrix $B_{K\times N}$ from the L2 memory 312 to a CIM memory 306. The method includes programming the A blocks buffered in the L1 memory 310 to the register file 308 to be entered into the CIM memory 306. The CIM memory 306 performs multiply-and-accumulate (MAC) calculations on the A blocks and the B blocks to generate C blocks which form a matrix $C_{M\times N}$ that is $A_{M\times K}\times B_{K\times N}$. Based on the size of the matrix $A_{M\times K}$, the size of the matrix $B_{K\times N}$, the A block buffering capability, μ, of the L1 memory 310, and the B block buffering capability, L, of the CIM memory 306, the method includes selecting a reuse scheme to reuse the A blocks buffered in the L1 memory 310 and the B blocks buffered in the CIM memory 306. The computer readable medium 318 may be provided to configure the computing system 300 to perform the proposed method.

There may be many variations of the CAKE algorithm with the proposed novel reuse strategy. Any reuse strategy that selects a reuse scheme based on not only the size of the matrices but also the buffering capability of the A blocks and the B blocks should be considered as being within the scope of the invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computing system with a compute-in-memory (CIM) design, comprising:
   a CIM processor, including a processor control unit, a CIM memory with CIM capability, and a register file; and
   a two-level memory system coupled to the CIM processor, wherein the two-level memory system includes a first-level (L1) memory and a second-level (L2) memory;
   wherein:
   the processor control unit loads A blocks divided from a matrix $A_{M\times K}$ from the L2 memory to the L1 memory, and loads B blocks divided from a matrix $B_{K\times N}$ from the L2 memory to the CIM memory;
   the processor control unit further programs the A blocks buffered in the L1 memory to the register file to be entered into the CIM memory, wherein the CIM memory performs multiply-and-accumulate (MAC) calculations on the A blocks and the B blocks to generate C blocks which form a matrix $C_{M\times N}$ that is $A_{M\times K}\times B_{K\times N}$; and
   based on size of the matrix $A_{M\times K}$, size of the matrix $B_{K\times N}$, an A block buffering capability, μ, of the L1 memory, and a B block buffering capability, L, of the CIM memory, the CIM processor selects a reuse scheme to reuse the A blocks buffered in the L1 memory and the B blocks buffered in the CIM memory.

2. The computing system as claimed in claim 1, wherein:
   the number of A blocks divided from the matrix $A_{M\times K}$ is $M_b\times K_b$, wherein $M_b=M/m$, and $K_b=K/k$;
   the number of B blocks divided from the matrix $B_{K\times N}$ is $K_b\times N_b$, wherein $N_b=N/n$; and
   $M_b$, $K_b$, and No representing the size of the matrix $A_{M\times K}$ and the matrix $B_{K\times N}$ are used in selecting the reuse scheme.

3. The computing system as claimed in claim 2, wherein: $m=n=m_c$, and $k=\alpha m_c$, where α is greater than 0.

4. The computing system as claimed in claim 3, wherein: in response to a situation wherein $M_b>1$ and $N_b>1$, the CIM processor judges $K_b$ to select the reuse scheme based on a threshold function T(•), wherein the threshold function T(•) is a function of the A block buffering capability, μ, of the L1 memory and $s_s$, the sparsity of the matrix $B_{K\times N}$, where $1\leq\mu\leq K_b$, and $0\leq s_s<1$.

5. The computing system as claimed in claim 4, wherein:

$$T(\cdot)=\frac{\mu}{(1-s_s)} \text{ or } T(\cdot)=T(M_b, N_b)=\frac{\mu}{(1-s_s)}\cdot\frac{M_b(N_b-1)}{N_b(M_b-1)}$$

which further depends on $M_b$ and $N_b$.

6. The computing system as claimed in claim 5, wherein: when min($L_{max}$, $K_b$)<T(•), the CIM processor sets the B block buffering capability, L, of the CIM memory to min(2, $K_b$), and selects a first reuse scheme first_reuse_A, where $L_{max}$ is an upper limit to which the CIM memory buffers the B blocks and, according to the first reuse scheme first_reuse_A, the A blocks buffered in the L1 memory are reused even if the CIM memory has updated the B blocks buffered therein.

7. The computing system as claimed in claim 5, wherein:
when $\min(L_{max}, K_b) \geq T(\cdot)$, the CIM processor sets the B block buffering capability, L, of the CIM memory to $\min(L_{max}, K_b)$, and selects a second reuse scheme first_reuse_B, where $L_{max}$ is an upper limit to which the CIM memory buffers the B blocks and, according to the second reuse scheme first_reuse_B, the B blocks buffered in the CIM memory are reused even if the L1 memory has updated the A blocks buffered therein.

8. The computing system as claimed in claim 3, wherein:
in response to a situation wherein $N_b > M_b = 1$, the CIM processor sets the B block buffering capability, L, of the CIM memory to $L = \min(L_{max}, K_b)$, and selects a first reuse scheme first_reuse_A, by which the A blocks buffered in the L1 memory are reused even if the CIM memory has updated the B blocks buffered therein.

9. The computing system as claimed in claim 3, wherein:
in response to a situation wherein $M_b > N_b = 1$, the CIM processor sets the B block buffering capability, L, of the CIM memory to $L = \min(L_{max}, K_b)$, and selects a second reuse scheme first_reuse_B, by which the B blocks buffered in the CIM memory are reused even if the L1 memory has updated the A blocks buffered therein.

10. The computing system as claimed in claim 3, wherein:
in response to a situation wherein $M_b = N_b = 1$, the CIM processor sets the B block buffering capability, L, of the CIM memory to $L = \min(L_{max}, K_b)$, without changing the previously selected reuse scheme.

11. A method for power saving of a compute-in-memory (CIM) design, comprising:
loading A blocks divided from a matrix $A_{M \times K}$ from a second-level (L2) memory to a first-level (L1) memory;
loading B blocks divided from a matrix $B_{K \times N}$ from the L2 memory to a CIM memory;
programming the A blocks buffered in the L1 memory to a register file to be entered into the CIM memory, wherein the CIM memory performs multiply-and-accumulate (MAC) calculations on the A blocks and the B blocks to generate C blocks which form a matrix $C_{M \times N}$ that is $A_{M \times K} \times B_{K \times N}$; and
based on the size of the matrix $A_{M \times K}$, the size of the matrix $B_{K \times N}$, an A block buffering capability, $\mu$, of the L1 memory, and a B block buffering capability, L, of the CIM memory, selecting a reuse scheme to reuse the A blocks buffered in the L1 memory and the B blocks buffered in the CIM memory.

12. The method as claimed in claim 11, wherein:
the number of A blocks divided from the matrix $A_{M \times K}$ is $M_b \times K_b$, wherein $M_b = M/m$, and $K_b = K/k$;
the number of B blocks divided from the matrix $B_{K \times N}$ is $K_b \times N_b$, wherein $N_b = N/n$; and
$M_b$, $K_b$, and $N_b$ representing the size of the matrix $A_{M \times K}$ and the matrix $B_{K \times N}$ are used in selecting the reuse scheme.

13. The method as claimed in claim 12, wherein:
$m = n = m_c$, and $k = \alpha m_c$, where $\alpha$ is greater than 0.

14. The method as claimed in claim 13, further comprising:
in response to a situation wherein $M_b > 1$ and $N_b > 1$, judging $K_b$ to select the reuse scheme based on a threshold function $T(\cdot)$, wherein the threshold function $T(\cdot)$ is a function of the A block buffering capability, $\mu$, of the L1 memory, and $s_s$, the sparsity of the matrix $B_{K \times N}$, where $1 \leq \mu \leq K_b$, and $0 \leq s_s < 1$.

15. The method as claimed in claim 14, wherein:

$$T(\cdot) = \frac{\mu}{(1-s_s)} \text{ or } T(\cdot) = T(M_b, N_b) = \frac{\mu}{(1-s_s)} \cdot \frac{M_b(N_b-1)}{N_b(M_b-1)}$$

which further depends on $M_b$ and $N_b$.

16. The method as claimed in claim 15, further comprising:
when $\min(L_{max}, K_b) < T(\cdot)$, setting the B block buffering capability, L, of the CIM memory to $\min(2, K_b)$, and selecting a first reuse scheme first_reuse_A, where $L_{max}$ is an upper limit to which the CIM memory buffers the B blocks and, according to the first reuse scheme first_reuse_A, the A blocks buffered in the L1 memory are reused even if the CIM memory has updated the B blocks buffered therein.

17. The method as claimed in claim 15, further comprising:
when $\min(L_{max}, K_b) \geq T(\cdot)$, setting the B block buffering capability, L, of the CIM memory to $\min(L_{max}, K_b)$, and selecting a second reuse scheme first_reuse_B, where $L_{max}$ is an upper limit to which the CIM memory buffers the B blocks and, according to the second reuse scheme first_reuse_B, the B blocks buffered in the CIM memory are reused even if the L1 memory has updated the A blocks buffered therein.

18. The method as claimed in claim 13, further comprising:
in response to a situation wherein $N_b > M_b = 1$, setting the B block buffering capability, L, of the CIM memory to $L = \min(L_{max}, K_b)$, and selecting a first reuse scheme first_reuse_A, by which the A blocks buffered in the L1 memory are reused even if the CIM memory has updated the B blocks buffered therein.

19. The method as claimed in claim 13, further comprising:
in response to a situation wherein $M_b > N_b = 1$, setting the B block buffering capability, L, of the CIM memory to $L = \min(L_{max}, K_b)$, and selecting a second reuse scheme first_reuse_B, by which the B blocks buffered in the CIM memory are reused even if the L1 memory has updated the A blocks buffered therein.

20. The method as claimed in claim 13, further comprising:
in response to a situation wherein $M_b = N_b = 1$, setting the B block buffering capability, L, of the CIM memory to $L = \min(L_{max}, K_b)$, without changing the previously selected reuse scheme.

\* \* \* \* \*